Figure 1:
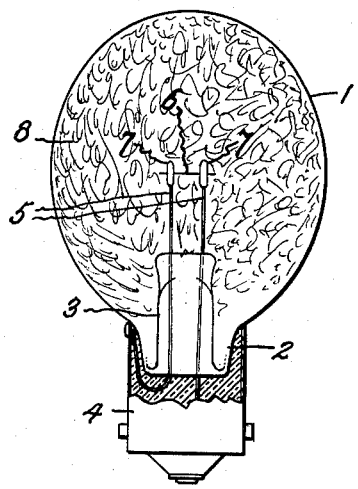

Nov. 19, 1957  P. D. JOHNSON  2,813,412
PHOTOFLASH LAMPS
Filed April 30, 1956

Inventor:
Peter D. Johnson,
by Paul A. Frank
His Attorney.

United States Patent Office 2,813,412
Patented Nov. 19, 1957

2,813,412

PHOTOFLASH LAMPS

Peter D. Johnson, Schenectady, N. Y., assignor to General Electric Company, a corporation of New York Application April 30, 1956, Serial No. 581,657

11 Claims. (Cl. 67—31)

The present invention relates to photoflash lamps in general. More particularly, the invention relates to photoflash lamps having increased efficiency of conversion of chemical energy to light.

Photoflash lamps presently utilized in photographic and allied arts generally are either of the primer type as disclosed and claimed in U. S. Patent 2,291,983, M. Pipkin, or of the wire or foil type as disclosed and claimed in U. S. Patent 2,178,428—E. Lemmers. In the former type photoflash lamps actinic light is produced solely by the burning of a solid combustible mixture coated upon the lamp electrode or filament, while, in the latter type, actinic light is produced primarily by the burning of a combustible material which may be a metallic wire, shredded foil or leaf foil distributed throughout the lamp envelope. Actinic light is generally light capable of inducing chemical changes, as for instance in the emulsion of a photographic plate.

It is a principal object of the present invention to provide photoflash lamps of the aforementioned types having a high efficiency of conversion of chemical energy into actinic light.

Still another object of the invention is to provide primer type photoflash lamps having a high efficiency of conversion of chemical energy into actinic light.

Yet another object of the invention is to provide wire or foil type photoflash lamps having a high efficiency of conversion of chemical energy into actinic light.

Yet another object of the invention is to provide photoflash lamps, the light emission of which is concentrated in the actinic, or photographically useful, spectrum, which may for the purposes of this specification be defined to extend from 3500 to 7000 angstrom units.

Briefly stated, in accord with the invention, I provide improved photoflash lamps having a high concentration of light emission in the actinic spectrum and, consequently, a high efficiency of conversion of chemical energy into actinic light. The foregoing is accomplished by adding to the combustible actinic light producing element of the lamps of the invention certain additives which increase the actinic light emission thereof. This increased actinic light emission causes a greater amount of actinic light being emitted per unit weight of combustible material, and results in lamps having increased efficiency of conversion of chemical energy into actinic light.

Figure 2:
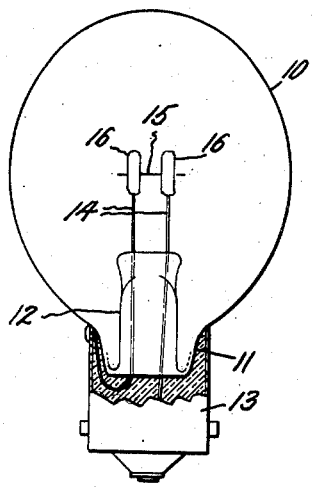

The novel features believed characteristic of the invention are set forth in the appended claims. The invention itself together with further objects and advantages thereof may best be understood by referring to the following description taken in conjunction with the accompanying drawing in which:

Figure 1 is an elevation view of a photoflash lamp illustrating one embodiment of the invention, Figure 2 is an elevation view of a photoflash lamp illustrating another embodiment of the invention.

In Figure 1 of the drawing, the photoflash lamp shown comprises an hermetically sealed envelope or bulb 1 of a suitable light transmitting material such as glass having a neck portion 2 and a solid reentrant portion 3. A suitable base 4 is secured to neck portion 2 as by cementing or other suitable means. Bulb 1 is filled with a combustion supporting gaseous filling which may be oxygen or a suitable oxygenous or oxidizing gas at a pressure of from approximately .2 to 2 atmospheres but preferably approximately 1 atmosphere. Bulb 1 may be coated on its inner or outer surface, preferably on both surfaces, with a coating of a suitable light transmitting lacquer or varnish to minimize cracking of the bulb on flashing and to render the bulb substantially shatter proof.

Sealed into the reentrant portion 3 of bulb 1 and extending thereinto from the neck portion 2 thereof are a pair of lead-in wires 5. Bridging the interior ends of wires 5 is a small ignition filament 6 which may comprise a length of wire of a suitable high resistance material such as tungsten. Mounted near the inner ends of lead-in wires 5 and at least partially embedding filament 6 are thin coatings 7 of a suitable primer or combustible material for causing an initial ignition flash within the lamp envelope. The primer material comprising coatings 7 may conveniently comprise a powdered mixture of a readily combustible metal, such as zirconium, and an oxygen liberating substance such as potassium chlorate or potassium perchlorate, bonded together by a suitable binder such as nitrocellulose. The interior of bulb 1 is filled with a flocculent metallic mass 8 of combustible actinic light producing material which may, for instance, be in the form of fine wires, shredded foil or leaf foil. Combustible material 8 comprises a major constituent of aluminum, magnesium or an alloy of magnesium and aluminum containing from 0 to 100% aluminum with which has been alloyed a minor portion of one or more metals selected from the group consisting of iron, nickel or cobalt.

Conventional photoflash bulbs used heretofore are similar to the bulbs of my invention but utilize as the flocculent metallic mass of combustible actinic light producing material, aluminum, and/or magnesium. While such bulbs have heretofore proved satisfactory in operation, I have found that the alloying of the hereinbefore listed materials in minor percentages with aluminum or magnesium flash elements has the effect of increasing the actinic light emission thereof and greatly increasing the efficiency of conversion of chemical energy into actinic light.

I have found that the actinic light conversion efficiency of photoflash lamps of this type may be greatly increased by alloying from 4 to 20% by weight of iron, nickel or cobalt with the combustible, light producing materials thereof. The additives must be added in an alloy or solid solution so that they be atomically dispersed within the main constituent in order to obtain the advantages of the invention. If less than 4% of iron, nickel or cobalt is alloyed with the main constituent, the addition is in sufficient to obtain the desired improvement in the lamps of the invention. If more than 20% of any of the additives is alloyed with the main constituent, the mechanical properties of the main constituent are adversely affected. Additionally, less chemical energy is available for conversion into actinic light. While useful increases in actinic light output of the photoflash lamps of the invention may be obtained with additions of the aforementioned metals in the aforementioned percentages or higher the preferred range for such additions is from 4 to 6% by weight. The optimum effect upon the actinic light output of the photoflash lamps of the invention is found in this range. When one of the alloys resulting from the above metallic additions is prepared in fine wire or shredded or leaf foil form according to techniques well known to the photoflash lamp art and placed within a photoflash lamp as illustrated in Figure 1 of the drawing, a much superior lamp results. This superiority is due to the fact that a much greater amount of the chemical energy present in the combustible material within the lamp is converted into actinic light than has been possible heretofore in conventional photoflash lamps.

One specific example, given for illustrative purposes and not in a limiting sense, of a preferred embodiment of the invention comprises a lamp as illustrated in Figure 1 of the drawing having an elliptical glass envelope having a major axis of 1⅝" and a minor axis of 1⅜". The bulb is filled with an atmosphere of commercial grade oxygen at a pressure of approximately 0.8 atmosphere. The primer coating on the lead-in wires is approximately ⅛" long and approximately 0.003" thick. The filament is a 0.0007" diameter tungsten wire. Flocculent combustible material 3 comprises approximately 30 milligrams of shredded foil approximately 0.0008" wide and thick and is composed of an alloy of 5% by weight of cobalt, the remainder being aluminum.

In Figure 2 of the drawing there is shown an elevation view of a photoflash lamp illustrating another embodiment of the invention. The photoflash lamp of Figure 2 includes an hermetically sealed light transmitting envelope 10 which may conveniently be of glass having a neck portion 11 and a reentrant portion 12. Envelope 12 is filled with oxygen or a suitable oxygenous or oxidizing gas at a pressure of 0.2 to 2 atmospheres, and preferably approximately one atmosphere. A suitable base 13 is cemented or otherwise fastened to neck portion 11 of envelope 10 and serves as a contact making member for the lamp. Supported within reentrant portion 12 of envelope 10 are a pair of lead-in electrodes 14, the interior ends of which are bridged by a small ignition filament 15 which may conveniently be of high resistance alloy or metal such as tungsten. Mounted on the inner ends of lead-in electrodes 14 and at least partially embedding filament 15 are a pair of beads 16 of a combustible mixture which comprises the sole source of actinic light generated by the lamp. Beads 16 are located at the same position as primer coatings 7 of the lamp in Figure 1 of the drawings. The former differ from the latter in the respect that while the latter serve primarily as means to ignite the flocculent means of combustible material disposed throughout the lamp envelope, the former serves as the sole source of actinic light within the lamp. For this reason beads 16 contain a much greater amount, from 10 to 100 times more of combustible material than the coatings 7 of the lamp illustrated in Figure 1 of the drawing.

Bead 16 of combustible mixture may conveniently comprise a powdered mixture of an alloy of zirconium or titanium with a minor portion of a material selected from the group consisting of iron, nickel, or cobalt, together with an oxygen liberating compound which may be potassium or sodium chlorate or potassium or sodium perchlorate or the substantial equivalents thereof. The amount of iron, nickel or cobalt which I have found to produce the desired increase actinic light emission without adversely affecting other characteristics of the lamps may vary from 4 to 20% by weight of the zirconium or titanium present. As with the first embodiment of the invention the greatest increase in actinic light is derived from additives of from 4 to 6% by weight.

In one specific example of this embodiment of the invention, given for illustrative purposes only, and not intended to be construed in a limiting sense, a lamp is constructed as illustrated in Figure 2. The lamp bulb is elliptical in shape and has a major axis of 1⅝" and a minor axis of 1⅜". The bulb is filled with commercial grade oxygen at a pressure of 0.8 atmosphere. Filament 15 is a 0.0007" tungsten wire and lead-in wires 14 are 0.010" nickel wires. Beads 16 each weigh approximately 25 milligrams and comprise 40% by weight potassium perchlorate and 60% by weight of a combustible, light-producing alloy of 5% by weight of cobalt, the remainder being zirconium, bound with a nitrocellulose binder.

I have found that photoflash lamps constructed in accord with this embodiment of the invention emit a greater amount of actinic light and hence have a greatly increased conversion efficiency of chemical energy to visible light.

The photoflash lamps of this invention may be produced in accord with standard manufacturing techniques. The lamps of the first described embodiment of this invention utilizing a wire or foil type actinic light producing combustible material may be produced in accord with the teachings of U. S. Patent 2,351,290—F. J. Rippl et al. Likewise, the bulbs of the second described embodiment of the invention wherein the combustible bead comprises the actinic light producing substance may be produced in accord with the aforementioned U. S. Patent 2,291,983—M. Pipkin.

While I have described the invention with reference to certain embodiments thereof many modifications will occur to those skilled in the art. I intend therefore by the appended claims to cover all such modifications as come within the true spirit and scope of the invention.

What I claim as new and desire to secure by Letters Patent of the United States is:

1. A photoflash lamp comprising a hermetically sealed light transmitting envelope; an oxygenous atmosphere within said envelope; and a charge of combustible; actinic light producing material within said envelope; said material comprising a major constituent selected from the group consisting of aluminum, magnesium, an alloy of aluminum and magnesium, zirconium, and titanium alloyed with 4% to 20% by weight of a minor constituent selected from the group consisting of iron, nickel and cobalt.

2. A photoflash lamp comprising a hermetically sealed light transmitting envelope; an oxygenous atmosphere within said envelope; and a charge of combustible actinic light producing material in the form of a flocculent metallic mass within said envelope; said metallic mass comprising aluminum alloyed with 4% to 20% by weight of a material selected from the group consisting of iron, cobalt and nickel.

3. A photoflash lamp comprising a hermetically sealed light transmitting envelope, an oxygenous atmosphere within said envelope, and a charge of combustible actinic light producing material in the form of a flocculent metallic mass within said envelope, said metallic mass comprising magnesium alloyed with 4% to 20% by weight of a material selected from the group consisting of iron, cobalt and nickel.

4. A photoflash lamp comprising a hermetically sealed light transmitting envelope, an oxygenous atmosphere within said envelope, and a charge of combustible actinic light producing material in the form of a flocculent metallic mass within said envelope, said metallic mass comprising an alloy of magnesium and aluminum and 4% to 20% by weight of a material selected from the group consisting of iron, nickel and cobalt.

5. A photoflash lamp comprising a hermetically sealed light transmitting envelope, an oxygenous atmosphere within said envelope, a pair of lead-in wires within said envelope, a high resistance filament bridging said electrodes, and a combustible actinic light producing mixture bonded to the interior ends of said electrodes and adapted to be ignited by said filament, said mixture comprising an oxygen liberating substance and a combustible metallic alloy of a first constituent selected from the group consisting of zirconium and titanium and 4% to 20% by weight of a second constituent selected from the group consisting of iron, cobalt and nickel.

6. A photoflash lamp comprising a hermetically sealed light transmitting envelope; an oxygenous atmosphere within said envelope; and a charge of combustible actinic light producing material in the form of a flocculent metallic mass within said envelope; said metallic mass comprising aluminum alloyed with 4% to 6% by weight of a material selected from the group consisting of iron, cobalt, and nickel.

7. A photoflash lamp comprising a hermetically sealed light transmitting envelope, an oxygenous atmosphere within said envelope and a charge of combustible actinic light producing material in the form of a flocculent metallic mass within said envelope, said metallic mass comprising magnesium alloyed with 4% to 6% by weight of a material selected from the group consisting of iron, cobalt and nickel.

8. A photoflash lamp comprising a hermetically sealed light transmitting envelope, an oxygenous atmosphere within said envelope, and a charge of combustible actinic light producing material in the form of a flocculent metallic mass within said envelope, said metallic mass comprising an alloy of magnesium and aluminum and 4% to 6% by weight of a material selected from the group consisting of iron, nickel and cobalt.

9. A photoflash lamp comprising a hermetically sealed light transmitting envelope, an oxygenous atmosphere within said envelope, a pair of lead-in electrodes within said envelope, a high resistance filament bridging said electrodes, and a combustible actinic light producing mixture bonded to the interior ends of said electrodes and adapted to be ignited by said filament, said mixture comprising an oxygen liberating substance and a combustible metallic alloy of a first constituent selected from the group consisting of zirconium and titanium and 4% to 20% by weight of a second constituent selected from the group consisting of iron, cobalt and nickel.

10. A photoflash lamp comprising an hermetically sealed light transmitting envelope, an oxygenous atmosphere within said envelope, a pair of lead-in electrodes within said envelope, a high resistance filament bridging said electrodes, and a combustible actinic light producing mixture bonded to the interior ends of said electrodes and adapted to be ignited by said filament, said mixture comprising an oxygen liberating substance and a combustible metallic alloy of a first constituent selected from the group consisting of zirconium and titanium and 4% to 6% by weight of a second constituent selected from the group consisting of iron, cobalt and nickel.

11. The photoflash lamp of claim 10 wherein the second constituent is iron.

References Cited in the file of this patent

UNITED STATES PATENTS 2,201,294    Kreidler _____ May 21, 1940